United States Patent
Mambakkam et al.

(10) Patent No.: US 6,976,623 B1
(45) Date of Patent: Dec. 20, 2005

(54) FLASH JUKE BOX

(75) Inventors: Sreenath Mambakkam, San Jose, CA (US); Arockiyaswamy Venkidu, Menlo Park, CA (US); Larry Lawson Jones, Stockton, CA (US)

(73) Assignee: OnSpec Electronic, Inc., Santa Clara, CA (US)

( * ) Notice: Subject to any disclaimer, the term of this patent is extended or adjusted under 35 U.S.C. 154(b) by 0 days.

(21) Appl. No.: 10/065,771

(22) Filed: Nov. 18, 2002

(51) Int. Cl.$^7$ .............................................. G06K 7/06
(52) U.S. Cl. ..................................... 235/441; 361/737
(58) Field of Search ....................... 700/231; 235/435, 235/439, 440, 441, 492; 710/62, 301, 302, 710/63, 64; 361/737

(56) References Cited

U.S. PATENT DOCUMENTS

| | | | | |
|---|---|---|---|---|
| 3,821,518 A | * | 6/1974 | Miller .......................... | 235/441 |
| 5,561,628 A | * | 10/1996 | Terada et al. ........... | 365/185.04 |
| 5,594,233 A | * | 1/1997 | Kenneth et al. ............. | 235/492 |
| 5,679,007 A | * | 10/1997 | Potdevin et al. ........... | 439/76.1 |
| 5,680,579 A | * | 10/1997 | Young et al. ............... | 711/157 |
| 5,750,973 A | * | 5/1998 | Kaufman et al. ........... | 235/441 |
| 5,929,427 A | * | 7/1999 | Harada et al. .............. | 235/492 |
| 6,010,066 A | * | 1/2000 | Itou et al. .................... | 235/379 |
| 6,097,605 A | * | 8/2000 | Klatt et al. .................. | 361/737 |
| 6,438,638 B1 | * | 8/2002 | Jones et al. ................. | 710/301 |
| 6,681,991 B1 | * | 1/2004 | Li ................................ | 235/439 |
| 6,722,572 B2 | * | 4/2004 | Ono et al. ................... | 235/492 |
| 6,859,369 B2 | * | 2/2005 | Mambakkam et al. ...... | 361/737 |
| 2001/0019077 A1 | * | 9/2001 | Bushchmann ............... | 235/439 |
| 2002/0080142 A1 | * | 6/2002 | Takase et al. ............... | 345/530 |
| 2002/0178307 A1 | * | 11/2002 | Pua et al. ...................... | 710/62 |
| 2003/0041203 A1 | * | 2/2003 | Jones et al. ................. | 710/301 |
| 2003/0046469 A1 | * | 3/2003 | Lui et al. ..................... | 710/301 |
| 2003/0060085 A1 | * | 3/2003 | Reece ......................... | 439/630 |
| 2003/0084220 A1 | * | 5/2003 | Jones et al .................. | 710/301 |
| 2003/0084221 A1 | * | 5/2003 | Jones et al. ................. | 710/302 |
| 2003/0095386 A1 | * | 5/2003 | Le at al. ...................... | 361/737 |
| 2003/0168511 A1 | * | 9/2003 | Lin ............................. | 235/441 |
| 2003/0178486 A1 | * | 9/2003 | Teng et al. .................. | 235/441 |
| 2003/0229745 A1 | * | 12/2003 | Shih ............................ | 710/301 |

FOREIGN PATENT DOCUMENTS

| | | | |
|---|---|---|---|
| EP | 0 744 708 A2 | * | 11/1996 |
| JP | 5-108905 A | * | 4/1993 |
| JP | 2000-200652 A | * | 7/2000 |
| JP | 2000-235463 A | * | 8/2000 |

* cited by examiner

*Primary Examiner*—Jared J. Fureman
(74) *Attorney, Agent, or Firm*—Greenberg Traurig, LLP

(57) ABSTRACT

A memory card reading apparatus is described including a plurality of memory card interfaces, with at least of subset of the plurality memory card interfaces configured to interface with a memory card of a first type, the plurality of memory card interfaces accessible in parallel. In one embodiment, at least on of the memory card interfaces is configured to interface with a plurality of different memory card types. In another embodiment, a first subset of the plurality of memory card interfaces are configured to interface with a memory card of a first type and a second subset of the plurality of memory card interfaces are configured to interface with a memory card of a second type, wherein the first and second subset of memory card interfaces are accessible in parallel.

19 Claims, 3 Drawing Sheets

FLASH JUKE BOX

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field

The present invention relates generally to flash memory readers, and more specifically to an improved configuration of the same.

2. Background

Digital cameras have become one of the most popular of electronic devices. In a recent year, more digital cameras were sold than traditional film cameras. Images from digital cameras can be downloaded and stored on personal computers. Digital pictures can be converted to common formats such as JPEG and sent as e-mail attachments or posted to virtual photo albums on the Internet. Video as well as still images can be captured, depending on the kind of digital camera.

Digital cameras typically capture images electronically and ultimately store the images as bits (one and zeros) on a solid-state memory. Flash memory is the most common storage for digital cameras. Flash memory contains one or more electrically-erasable programmable read-only memory (EEPROM) integrated circuit chips that allow reading, writing, and block erasing.

Early digital cameras required the user to download or transfer the images from the flash memory within the digital camera to a personal computer (PC). A standard serial cable was most widely used. However, the limited transfer rate of the serial cable and the large size of the digital images made such serial downloads a patience-building experience. Serial downloads could easily take half an hour for only a few dozen images.

Digital camera manufacturers solved this problem by placing the flash memory chips on a small removable card. The flash-memory card could then be removed from the digital camera, much as film is removed from a standard camera. The flash-memory card could then be inserted into an appropriate slot in a PC, and the image files directly copied to the PC.

The flash-memory cards are also used for many other electronic devices. As a result, a user may have multiple memory cards of several different types. For example, a user may have two or three Memory Stick cards for a Sony MP3 player, a couple of Smart Media cards for a Fujitsu camera, etc.

When the user sits at his computer, he may want to keep the cards in a device designed like a juke box, so he can access them, transfer files among them, and otherwise manipulate them "on demand." Furthermore, with the recent development of write once/read many (WORM) flash modules such as are offered by various companies, including Matrix Semiconductor, users now have the opportunity to create archives of media files such as music, movies, etc.

What is clearly needed is a memory card jukebox that may be used to make a multitude of such memory/media cards available simultaneously, allowing a user to read and copy among them, etc., without having to manually shuffle them in and out of their readers.

SUMMARY OF INVENTION

Other features and advantages of embodiments of the present invention will be apparent from the accompanying drawings, and from the detailed description, that follows below.

An embodiment of the present invention provides a memory card reading apparatus including a plurality of memory card interfaces, with at least a subset of the plurality memory card interfaces configured to interface with a memory card of a first type, the plurality of memory card interfaces accessible in parallel. In one embodiment, at least one of the memory card interfaces is configured to interface with a plurality of different memory card types. In another embodiment, a first subset of the plurality of memory card interfaces are configured to interface with a memory card of a first type and a second subset of the plurality of memory card interfaces are configured to interface with a memory card of a second type, wherein the first and second subset of memory card interfaces are accessible in parallel. In yet another embodiment, at least one of the memory card interfaces includes an indicator identifying a status of an operation for a respective memory card interface.

Other features and advantages of embodiments of the present invention will be apparent from the accompanying drawings, and from the detailed description, that follows below.

BRIEF DESCRIPTION OF DRAWINGS

The invention may be best understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Figure 1:
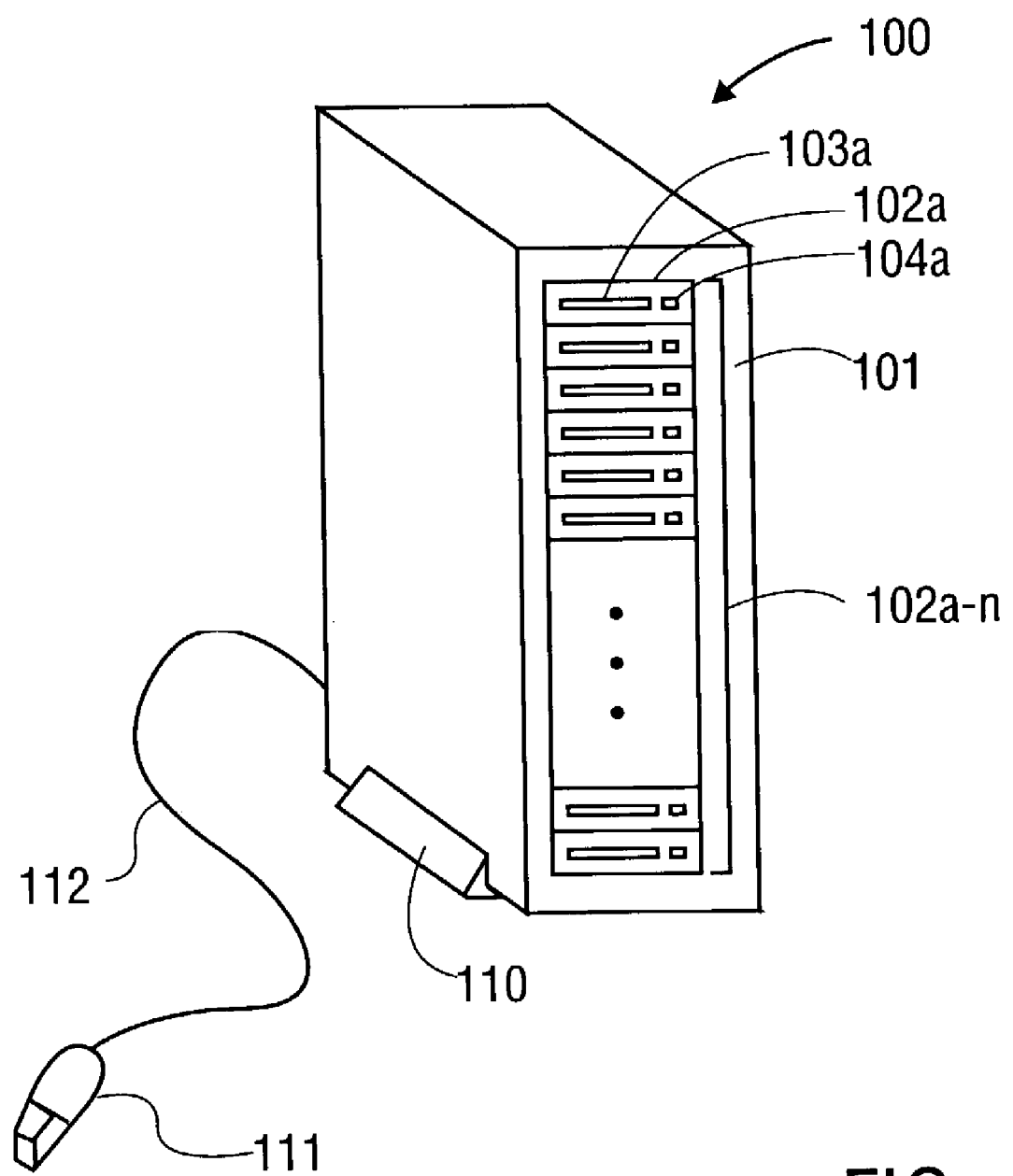
FIG. 1 shows a view of memory/media jukebox 100, in accordance with one embodiment.

FIG. 1 shows a view of media jukebox 100, in accordance with one embodiment. Visible at the front are the slot modules 102a–n and slot openings 103a–n (not all openings identified as illustrated in FIG. 1). For example, opening 103a of slot module 102 may be for a single medium type in one embodiment. In an alternative embodiment, opening 103a of slot module 102 may be for multiple media types. As described herein, the terms memory and media are used interchangeably within the scope of the invention.

In one embodiment, the slot module and slot opening are implemented using the techniques and specifications disclosed in co-pending application titled SMART UNIVERSAL FLASH MEDIA CARD ADAPTERS filed Sep. 4, 2002, application Ser. No. 10/064,966, which is a continuation of Ser. No. 10/167,929 which is a continuation of Ser. No. 09/610,904, also a continuation of Ser. Nos. 10/039,685 and 10/002,567, all of which are herein incorporated by reference.

In one embodiment, each slot, or less than all slots, may have an indicator, such as, for example, indicator 104a, as shown in FIG. 1. In one embodiment, the indicator may be a LED. In some cases, for example, the indicator may be green during a read operation, or red during a write operation (to warn the user not to eject the card during a write operation). In alternative embodiments, indicators other than LED may be used to indicate specific activity of a respective slot, without departing from the scope of the invention.

In one embodiment, the number of slots in a juke box may vary within the scope of the invention. For example, the range of slots may vary from perhaps eight at the low end to up to 20, 50, or even 100 at the high end, depending on many application factors.

In one embodiment, the slots may accept, as mentioned above, not only standard flash media, but also Write Once Read Many (WORM) flash media that are used for archive purposes and are intended to replace film, for example, on a permanent basis. Furthermore, the juke box, apparatuses, system, and devices as described herein are also applicable to memory and media cards other than flash, without departing from the scope of the invention.

Also shown in FIG. 1 are foot 110 and cable 112, which in one embodiment comes from USB connector 111, which supplies power, control, and data signals from a host computer (not shown) that manages the jukebox. In other embodiments, interfaces other than USB or USB 2.0 are also suitable, such as "1394" (a.k.a. Fire Wire or IEEE 1394), power, or any of many other proprietary or industry-standard interface protocols. In some cases, a separate external power supply (not shown) may be desired or required; and in yet other cases, the unit may include a battery compartment (also not shown) for operation in situations where no external power is available.

Figure 2:
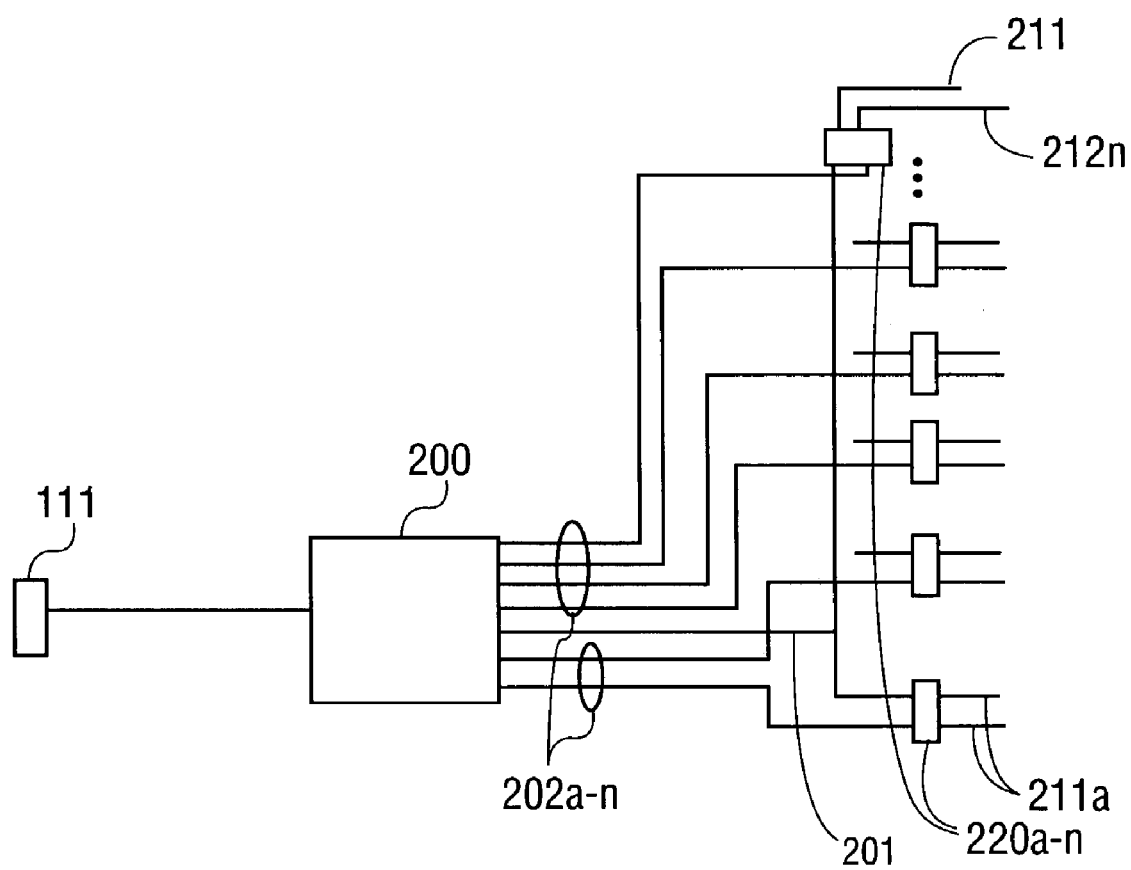
FIG. 2 illustrates a diagram of controller 200, in accordance with one embodiment.

FIG. 2 illustrates a diagram of controller 200, in accordance with one embodiment. In one embodiment, the controller 200 is implemented and includes the techniques and specifications as disclosed in co-pending U.S. application Ser. No. 10/167,929, which was filed on Jun. 11, 2002, entitled "Smartconnect Universal Flash Media Card Adapters", which is incorporated herein by reference.

As illustrated in FIG. 2, USB connector 111 connects controller 200 to the host computer. In addition to a standard bus 201 for controlling the slots 102a–n, controller 200 has a multitude of multiplexed control lines 202a–n. In one embodiment, the lines 202a–n address multiplexors, or transfer buffers, 220a–n, which in one embodiment may turn on/off selected control lines 212a–n and/or data lines 211a–n to activate/deactivate or communicate data with the flash media in each respective slot(s).

Depending on the implementation, the multiplexors 220a–n may disconnect all the control lines 211a–n connecting to the flash media, or in some cases, they may disconnect only selected lines of flash media. Selected data lines 212a–n may also activate the actual flash media, in case they are all parallel, and, depending on the configuration, power to the flash media may also be turned on or off.

Furthermore, in cases where an indicator (e.g., an LED) such as 104a–n is available, that indicator may also be controlled by certain lines, such as, for example, one of the control lines of 211a–n, or alternative one the bus lines 212a–n. As described above, the indicator may, for example, be multi colored, offering various colors, such as red during writing and green during reading, and no light when not in use. Alternatively, a single light may be used, such as, for example, blue, with a steady light to indicate writing and a rapidly blinking light to indicate reading.

In alternative embodiments, if the unit has only a small number of slots, buffers may not be needed and only chip select signals may be used to activate and deactivate the various cards. In yet other cases, multi-tiered bus lines may be used. For example, a unit with 100 slots may use five segments with 20 slots each, and an additional layer of buffers must be introduced in a hierarchical wiring scheme.

Figure 3:
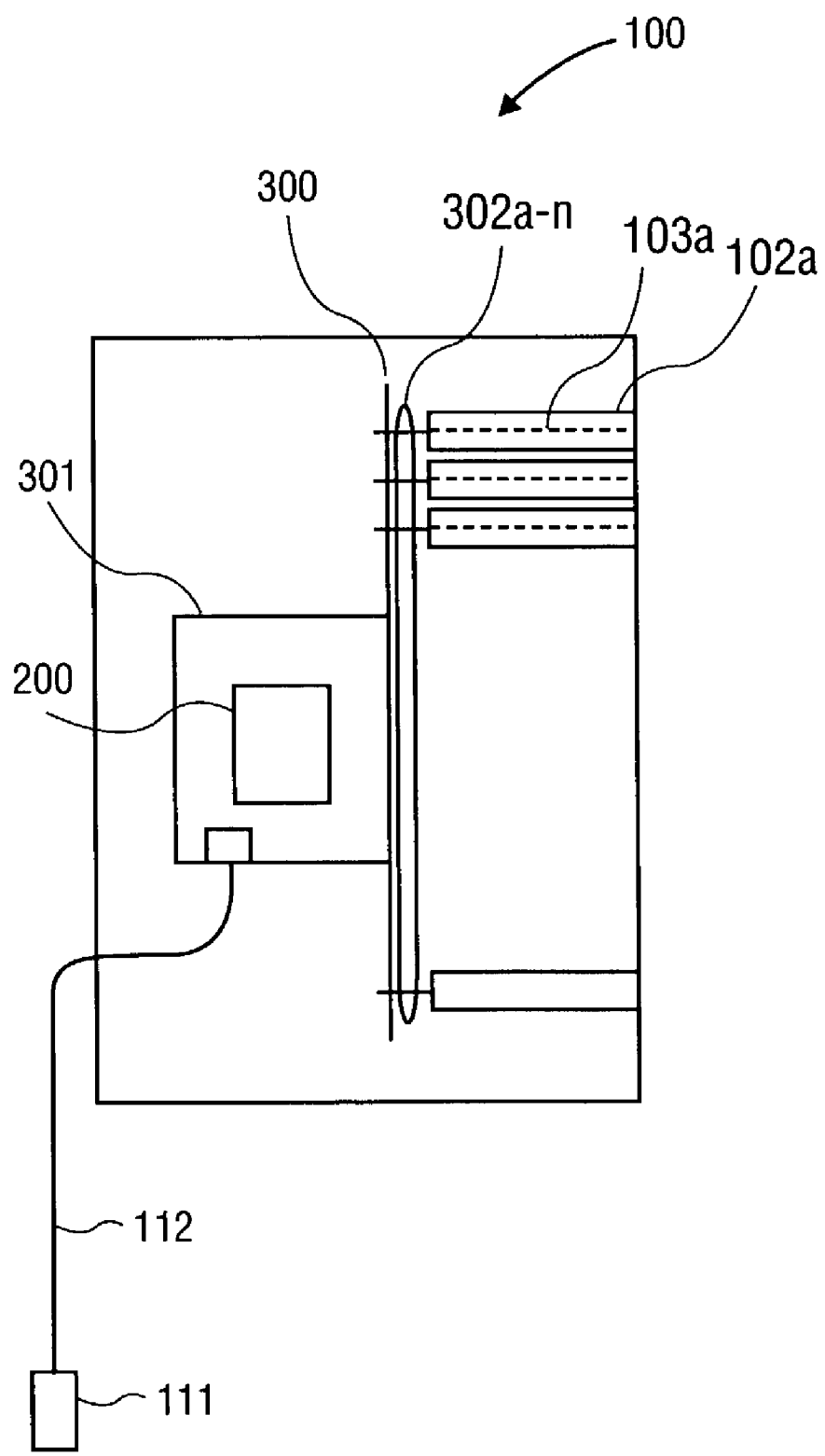
FIG. 3 illustrates the mechanical configuration of the memory/media jukebox, in accordance with one embodiment.

FIG. 3 illustrates the mechanical configuration of the flash jukebox, in accordance with one embodiment. In one embodiment, previously discussed, the slot modules are implemented with the techniques and include the specifications as disclosed in co-pending U.S. application Ser. No. 10/064,966, which is incorporated herein by reference. For example, in one embodiment the slot modules may have pins that go directly into a vertical PCB, (i.e., a backplane), such as backbone 300. As illustrated in FIG. 3, backbone 300 is connected to a controller board 301, containing controller 200, which connects to cable 112 for USB port 111. In the example configuration, the buffer chips would be slightly skewed (offset) to the contacts 302a–n, and the mechanical pins from each of the single-port multimedia adaptors 102a–n would be inserted directly into backbone 300. Such an arrangement could reduce wiring.

In other cases (not shown), backbone 300 may be composed of sections, and each section may have a ribbon cable or flexible PCB attachment (not shown) to connect to controller board 301. Other, similar configurations may be used without departing from the spirit of the novel art of this disclosure.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

It is further desired that in one embodiment the jukebox include a text display, such as an LCD panel. The text display of the jukebox would include a method by which text can be scrolled or written and manipulated. In one embodiment, the SCSI (Small Computers System Interface) command set is utilized to scroll, write, and manipulate text displayed on a display of the jukebox.

In one embodiment, the SCSI command set is extended to support a new class of devices, called the Simple Display device. In one embodiment, the commands to manipulate text and simple graphics would include commands such as: Get Display sizeWrite One RowWrite One ColumnRead One RowRead One ColumnSet Window Size (a sub-set of Get Display Size)Get Window SizeSet Repetition RateGet Repetition RateGet Display capabilities In alternative embodiment, additional commands may be used, or less than all the commands listed above may be used without departing from the scope of the invention.

In one embodiment, to assist in providing compatibility with the Operating Systems and the driver stack, a jukebox with display capabilities will report itself as a Mass Storage Device on LUN (Logical Unit) 0 with 0 LUNs and a Simple Display Device on LUN 1. Application software issues inquiry command with LUN 0 and then LUN 1 and a jukebox with display capabilit. ie ans would respond with success to both the LUNs whereas a jukebox without would only respond to LUN 0. Alternative encodings may be implemented without departing from the scope of the invention.

What is claimed is:

1. A memory card interface apparatus comprising:
   a plurality of memory card interfaces comprising a first subset to interface with a memory card of a first type and a second subset to interface with a memory card of a second type, wherein the memory card of the first type and the memory card of the second type are accessible in parallel to transfer data from the memory card of the first type to the memory card of the second type.

2. The apparatus of claim 1, wherein at least one of the memory card interfaces is configured to read a plurality of different memory card types.

3. The apparatus of claim 1, wherein at least one of the memory card interfaces includes an indicator identifying a status of an operation for a respective memory reader interface.

4. The apparatus of claim 1, wherein the indicator includes a light indicating data is being written to a card in the respective memory card interface.

5. The apparatus of claim 1, wherein at least one of the memory card interfaces is configured to interface with a Write Once Read Many (WORM) memory card.

6. The apparatus of claim 1, wherein mechanical pins, of at least one of the plurality of memory card interfaces, are inserted directly into a backbone of the apparatus.

7. The apparatus of claim 1, wherein the apparatus includes a text display, wherein text on the display is manipulated using Simple Display Device commands.

8. The apparatus of claim 1, wherein the apparatus includes a text display, wherein text on the display is manipulated using Small Computer System Interface commands.

9. A system comprising:
   a controller circuit;
   a bus coupled to the controller circuit;
   a plurality of memory card interfaces comprising a first subset to interface with a memory card of a first type and a second subset to interface with a memory card of a second type, wherein the memory card of the first type and the memory card of the second type are accessible in parallel to transfer data from the memory card of the first type to the memory card of the second type.

10. The system of claim 7, wherein at least one of the memory card interfaces is configured to interface with a plurality of different memory card types.

11. The system of claim 7, wherein at least one of the memory card interfaces includes an indicator identifying a status of an operation for a respective memory card interface.

12. The system of claim 9, wherein the indicator includes a light indicating data is being written to a card in the respective memory card interface.

13. The system of claim 7, wherein at least one of the memory card interfaces is configured to interface with a Write Once Read Many (WORM) memory card.

14. The system of claim 7, wherein mechanical pins, of at least one of the plurality of memory card interfaces, are inserted directly into a backbone of the system.

15. The system of claim 9, wherein the system includes a text display, wherein text on the display is manipulated using Simple Display Device commands.

16. The system of claim 9, wherein the system includes a text display, wherein text on the display is manipulated using Small Computer System Interface commands.

17. A method comprising:
   providing access to a plurality of memory card interfaces comprising a first subset to interface with a memory card of a first type and a second subset to interface with a memory card of a second type; and
   selectively operating the first and second subsets to provide access to the memory cards of the first and second types in parallel to transfer data from the memory card of the first type to the memory card of the second type.

18. The method of claim 17, wherein at least one of the memory card interfaces is configured to interface with a plurality of different memory card types.

19. The method of claim 17, wherein at least one of the memory card interfaces includes an indicator identifying a status of an operation for a respective memory card interface.

* * * * *

UNITED STATES PATENT AND TRADEMARK OFFICE
CERTIFICATE OF CORRECTION

PATENT NO. : 6,976,623 B1 Page 1 of 1
APPLICATION NO. : 10/065771
DATED : December 20, 2005
INVENTOR(S) : Sreenath Mambakkam et al.

It is certified that error appears in the above-identified patent and that said Letters Patent is hereby corrected as shown below:

Column 5,
Line 45, remove "claim 1" and replace with -- claim 3 --.

Column 6,
Line 16, remove "claim 7" and replace with -- claim 9 --.

Column 6,
Line 19, remove "claim 7" and replace with -- claim 9 --.

Column 6,
Line 23, remove "claim 9" and replace with -- claim 11 --.

Column 6,
Line 26, remove "claim 7" and replace with -- claim 9 --.

Column 6,
Line 29, remove "claim 7" and replace with -- claim 9 --.

Signed and Sealed this

Twentieth Day of February, 2007

JON W. DUDAS
*Director of the United States Patent and Trademark Office*